Figure 1:
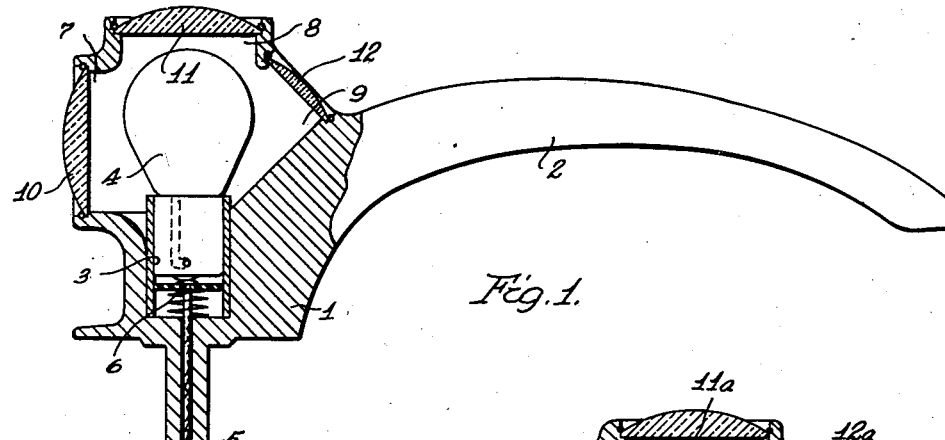

Jan. 19, 1943.　　A. E. WILSHUSEN　　2,308,844
DIRECTION INDICATOR
Filed Nov. 16, 1939　　2 Sheets-Sheet 1

INVENTOR.
August E. Wilshusen
BY
Windsor Davis
ATTORNEY.

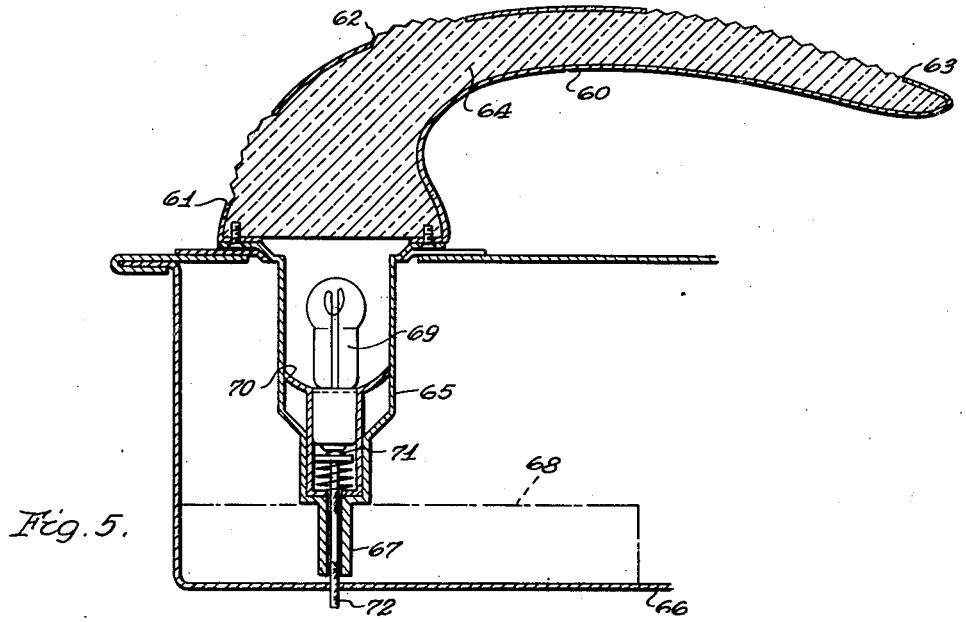
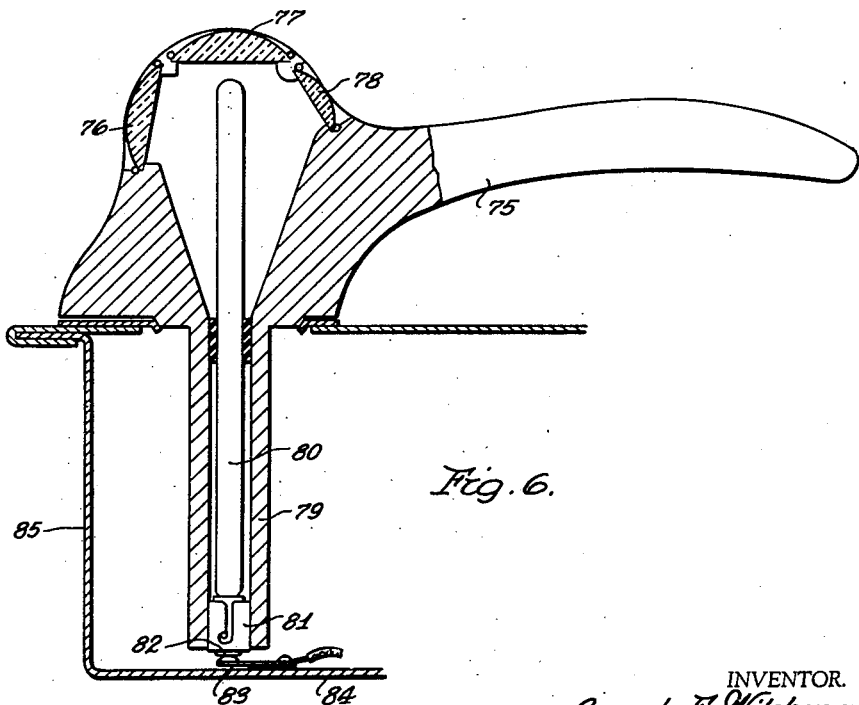

Patented Jan. 19, 1943

2,308,844

UNITED STATES PATENT OFFICE 2,308,844

DIRECTION INDICATOR

August E. Wilshusen, Detroit, Mich.

Application November 16, 1939, Serial No. 304,743

1 Claim. (Cl. 177—329)

This invention relates to direction indicators for automobiles and has for its primary object to provide indicating means in the door handles at opposite sides of automobiles, and means manually operable from within the automobile to operate the indicating means selectively in order that the operator of the automobile may signal his intention to make a right or left turn.

More specifically, the invention has for its main object to provide the door opening handles of automobiles with lenses and illuminating means, controllable from within the automobile. In this respect the handles are provided with a lens which is rearwardly disposed so that a signal may be given to the operators of following vehicles, they are provided with a lens at the outside thereof so that a signal is given to pedestrians at the side of the vehicle, and also with a lens in the front portion thereof in order that a signal may also be given to the operators of approaching vehicles.

The desirability of direction indicators for use with automobiles has long been recognized, and probably one of the most important reasons why they have not been previously adopted is that their appearance is not satisfactory. The accessory type direction indicator does not blend with the design of the modern automobile, and, therefore, detracts from the appearance of the automobile. In this respect this invention has an important object to provide a direction indicator which does not alter the general appearance of the automobile in any material respect, and which in no way resembles a "tacked-on accessory." To this end the invention teaches the use of the conventional door handles as a housing for and as an integral part of the indicators. This location is important from the standpoint of appearance for the reason that the door handles already being present may be modified to include the invention without altering the appearance of the automobile.

Another object is to provide signal means within the handle of the door and illuminating means therefor supported within the door, and, more specifically, to teach alternative means for mounting the illuminating means. In one instance, the lamp which constitutes the illuminating means is mounted in an enlargement in the door latch operating stem, and the light rays are conducted and diffused through the handle to the points where the light is emitted for signalling purposes. The handle, in this case, comprises a sheet metal shell filled with a transparent plastic material, which is molded therein, the metal shell reinforcing the plastic and providing a shield which prohibits emission of light except at the points where openings are provided in the shell. The plastic material is, of course, colored so as to provide a colored signal or it may, if desired, be colorless in which case colored inserts in the form of lenses are provided at the openings.

In the other alternative form the latch operating stem is enlarged and provided with a socket at its inner end in which an elongate lamp is placed. The lamp has one terminal grounded through the stem and its other terminal engages a yielding contact member mounted on the inner wall of the door. The lamp extends through the hollow stem and into a hollow handle which has light emitting lenses similar to those of the metal handle above mentioned.

Another object is to provide an improved switch member adapted to be mounted within an automobile for energizing signals of the type above referred to. In this respect the control unit is so designed that it may be mounted upon the dash of an automobile, or in the case of an accessory, upon a panel which is adapted to replace the ash tray and its supporting panel, which is usually provided on the dash of the automobile.

Another object is to provide means in conjunction with the control switch for indicating to the operator of the automobile whether or not the signals are operative. This means comprises a small dash signal lamp in circuit with the two direction signals located on opposite sides of the automobiles. When the control switch is operated and the dash signal fails to operate the automobile operator is informed that the direction signal is inoperative, in order that he may make the necessary manual signals. The dash signal also serves to remind the operator to discontinue operation of the direction signals after the signalled turns have been completed.

Another object is to provide a signal system of the type above mentioned which includes a flasher device for causing the signals to flash on and off when rendered operative by the control switch. In this respect it is the purpose to attract attention to the signal device by flashing the same say at the rate of 85 to 95 per minute.

Figure 2:
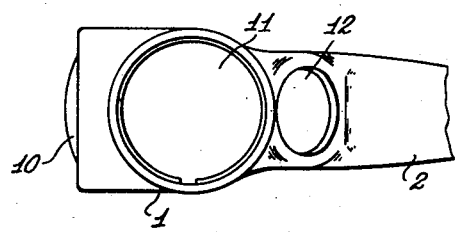
Figure 3:
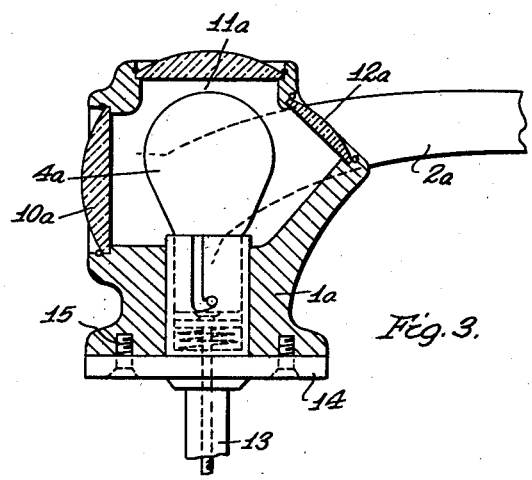
Figure 4:
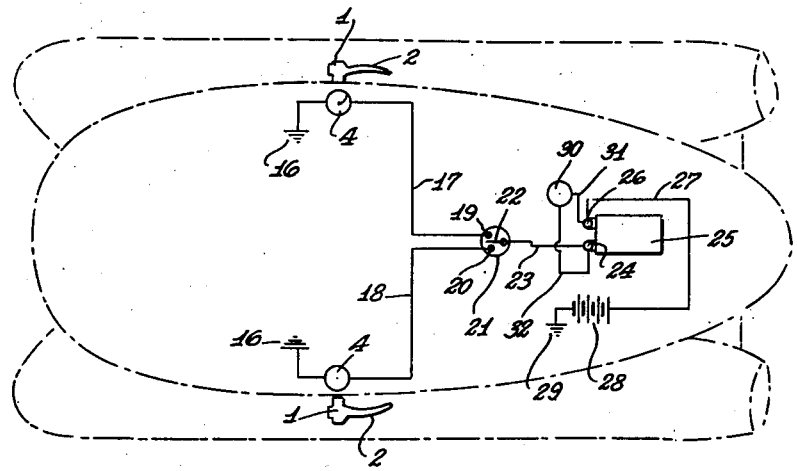

Other objects and advantages will become more fully apparent as reference is had to the accompanying drawings wherein my invention is illustrated, and in which:

Fig. 1 is a plan of a door handle, partly broken away and in cross section, to expose the signal means contained therein, Fig. 2 is a fragmental side elevation, Fig. 3 is a cross section illustrating a modified construction of the handle, Fig. 4 is a diagram illustrating the electric circuit, Figs. 5 and 6 are cross sections illustrating alternative door handle signals.

More particularly, 1 designates a handle body which is representative of any of the door handles present on modern automobiles, and having a grip portion 2 extending in a direction forward with respect to the automobile. The body 1 is hollow, and has a lamp socket 3 therein receiving an incandescent lamp bulb 4. The lead in wire 4', which supplies current to one terminal of the lamp bulb, extends through a hollow stem 5 to a resiliently supported contact member 6. The other terminal of the lamp bulb is grounded through the socket member, body 1 and stem 5. The stem 5 is the usual square stem which operates the door latching mechanism.

The body 1 has three openings 7, 8 and 9, in which lenses 10, 11 and 12 are respectively mounted. The opening 7 is rearwardly disposed, and the lens 10 is of red color, and when the lamp 4 is illuminated they provide a red signal to trailing vehicles. The opening 8 and the lens 11 are laterally or outwardly directed, and the lens is also of red color in order to provide a signal when the lamp 4 is illuminated to pedestrians and vehicle operators at the side of the automobile. The opening 9 and lens 12 are directed forwardly and outwardly, and the lens 12 is preferably of amber color, and when the lamp 4 is illuminated a signal is given to persons or vehicle operators in front of the automobile.

Fig. 3 illustrates a combined door handle and signal device comprising a body 1a having a rearwardly directed lens 10a, an outwardly directed lens 11a and a forwardly directed lens 12a, arranged similarly to those above described, and adapted to be illuminated by a lamp bulb 4a. A latch operating stem 13 has a flange 14 to which the body 1a is attached by screws 15, the screws being concealed when the stem 13 is assembled in a door latch in order to prevent theft of the door handle. The handle grip 2a in this case is connected to the body 1a at a point either at the top or bottom thereof so that it does not interfere with vision of any of the lenses.

Referring to the diagram shown in Fig. 4, the lamps 4, which are grounded at 16, are connected by wires 17 and 18 to contacts 19 and 20, respectively, of a two-way switch 21. The contactor 22 of the two-way switch, which is adapted to engage either of the contacts 19 or 20 or remain in an intermediate position as shown, is connected by a wire 23 to a terminal 24 of a flasher device 25. The flasher here shown is of a conventional type, obtainable on the open market, and, therefore, is not illustrated in detail here. When energized, it interrupts the electric circuit which energizes say 85 to 95 times per minute. The other terminal 26 of the flasher is connected by a wire 27 to a battery 28 which is grounded at 29. A dash signal lamp 30 is connected by a wire 31 to the terminal 26, and by a second wire 32 to the terminal 24.

When the contactor 22 is selectively placed in engagement with one of the contacts 19 or 20 the lamps 4 are selectively energized, and the presence of the flasher 25 causes the selected illuminated lamp 4 to flash. The lamp 30, which is mounted on the dash of the automobile being connected to both terminals 24 and 26, is illuminated with the selected lamp 4. It will be noted that the dash signal lamp 30 cannot be energized unless the circuit through one of the lamps 4 is completed, and, therefore, failure of either lamp 4 to become illuminated when the control switch is closed is indicated to the operator by failure of the lamp 30 to become illuminated.

The handle shown in Fig. 5 comprises a metallic shell 60, preferably formed as a stamping, and having three openings 61, 62 and 63 therein. The opening 61 is disposed rearwardly, and is visible to persons at the rear of the vehicle upon which the handle is mounted, the opening 62 is disposed on the outside of the handle, and the opening 63 is located at the outside of the forward, inwardly curved portion of the handle so as to be visible to persons to one side of the front of the automobile. The handle shell is entirely filled with a light diffusing material 64, which may be of red or other suitable color, and which might, for example, be of plastic material such as Lucite.

The handle above described is mounted on a hollow stem 65, which extends inwardly of the door 66, and which has a reduced end portion 67. The reduced end portion 67 is adapted to actuate a conventional automobile door latch mechanism generally indicated in outline by the broken lines 68.

Within the hollow stem 65 is a lamp 69 and a reflector 70, the lamp having one terminal thereof grounded through the stem and its other terminal engaging a yieldingly supported contact 71 in the stem 65. An electric wire 72 extends through the hollow stem 67 to the contact 71, and the portion of the wire which extends outwardly of the door will be covered by an upholstery panel (not shown) which is ordinarily attached to the exposed inner surface of the door.

Fig. 6 illustrates a hollow handle 75 having lenses 76, 77 and 78 therein for emitting light rays therefrom. Connected to the handle 75 is a hollow stem 79 which is larger than the usual stem and hollow to accommodate an elongate lamp 79. The lamp 79 may be a neon tube.

The lamp 79 is supported in a socket 81 at the inner end of the stem 79 and is supported thereby with its terminal 82 in engagement with a yielding contact 83 carried by the inner wall 84 of the door 85. The lamp 80 extends through the hollow stem 79 into the hollow handle and light rays therefrom are emitted from the handle through the lenses 76, 77 and 78.

What is claimed is:

In combination with a door of a vehicle, a door handle comprising an elongated portion made of light transmitting material and curved at one end, an opaque casing for a portion of said handle terminating adjacent said curved portion, a handle stem within said door having a flange exteriorly of said door for attachment to that end of said casing which terminates adjacent the curved portion of the light transmitting material, and an electric lamp within said stem adapted to shine its rays on the end of the curved end of said light transmitting material.

AUGUST E. WILSHUSEN.